UNITED STATES PATENT OFFICE.

STANISLAS SOREL, OF PARIS, FRANCE.

IMPROVED COMPOSITION TO BE USED AS A CEMENT AND AS A PLASTIC MATERIAL FOR MOLDING VARIOUS ARTICLES.

Specification forming part of Letters Patent No. 53,092, dated March 6, 1866.

*To all whom it may concern:*

Be it known that I, STANISLAS SOREL, of Paris, in the Empire of France, have invented certain new and useful Improvements in Cement or Composition for Agglomerating or Molding Various Materials, and for other purposes; and I hereby declare that the following is a full, clear, and exact description of the same.

This cement is composed of the oxychloride of magnesium, either pure or mixed with other substances. The cement can be formed in two different ways: First, by diluting magnesia which may be more or less hydrated and carbonated with a solution of chloride of magnesium more or less concentrated. I employ a solution of from 25° to 35°, according to the areometer of Baumé. The chloride and magnesia can be mixed with different substances, some of which will be hereinafter indicated; second, in place of diluting the magnesia with a solution of the chloride of magnesium, the chloride in a dry state can first be mixed with the magnesia, and then by adding water the cement can be formed. The chloride is desiccated or dried by means of heat until it ceases to give out any water vapor. When large quantities of the chloride are to be dried the operation can be commenced in boilers and finished in reverberatory furnaces. When the chloride is dry it can be crushed by grindstones and then mixed with the magnesia. If a powder on which the chloride of magnesium has no chemical action is used with the magnesia the desiccated chloride should be triturated with this powder before adding the magnesia.

If it is wished to give more density to the magnesia it should first be moistened with water or with a weak solution of chloride of magnesium and triturated and dried. It is then mixed with the chloride of magnesium in the following proportions: To one hundred parts, in weight, of magnesia, pure or mixed with other substances, add about twelve parts, in weight, of the chloride of magnesium, or about the chemical equivalent of chloride of magnesium dried, and the chemical equivalent of calcined magnesia. The proportions, however, may be varied.

The cement should be kept from all contact with the atmosphere in barrels or other receptacles tightly closed.

Magnesia and the chloride of magnesium are the two principal ingredients or elements of the new cement; but these elements can without trouble be mixed with other powdered substances. There is even an advantage in mixing the certain substances with the magnesia, especially the sulphate of baryta, of which a quantity may be added of equal weight with that of the magnesia; also, sulphate of lime, kaolin, talc, pipe-clay, sulphur, carbonate of lime, argilliferous earth, calcined or non-calcined oxides, and most substances insoluble by the chloride, and which can be more or less easily pulverized. One can even add ivory-dust, sawdust, and analogous substances, the flour of cereals and vegetables, of feculas, &c.

By adding to the cement coloring-matter, such as ultramarine-yellow and chrome-green, vermillion, ochers, &c., imitations can be made of mosaics and of all kinds of marble. Such hard substances as sand, sandstone, emery, &c., can enter in the composition of the cement, and with this mixture can be made very solid grindstones or whetstones and coatings which cost very little. The mixture of iron filings or cast-iron shavings with this cement forms an excellent material for securing iron bars, &c., in stone.

The chloride of magnesium can also, even when containing certain salts, make a good cement. The mother-liquor or residuum of salines can even be employed without any modification, taken at its ordinary degree of concentration. According to M. Regnault this liquor is marked at 30° on the areometer, and contains in a hundred parts:

| | |
|---|---|
| Chloride of magnesium, | 16.6 |
| Chloride of sodium, | 4.6 |
| Sulphate of magnesia, | 2.0 |
| | 23.2 |

The cement obtained with the liquid resists the action of boiling water as well as that made with the solution of chloride of magnesium.

In concentrating the mother-liquor above mentioned until it is at 40° the chloride of sodium and sulphate of magnesia become crystallized, and the chloride of magnesium alone remains in solution, which can be used for the cement. This is preferable to the mixture of the salts above mentioned.

The principal uses of this magnesium-cement are as follows: First, its aggregation with sand, sandstone, granite, and with other pulverulent substances, in order to form with them grindstones, tiles, blocks of stones for the construction of quays, &c.; second, its aggregation with flint, sandstone, granite, emery, &c., with pumice-stone or jewelers' red for the manufacture of whet and polishing stones, of mullers of emery, pumice, &c., for polishing marble, glass, or wood; third, its aggregation with kaolin, talc, sulphate of baryta, sulphate of lime, pyrites of iron, ochers, sulphate of lead, to form a plastic substance fit for molding statues, ornamental vases, objects of art, to take impressions or to form crucibles or other utensils; fourth, its aggregation with sawdust in laying inlaid floors or preparing wainscoting to be used to ornament them, and as a preservative against dampness; fifth, its aggregation with wool or cotton shavings, with leather powder, with ivory or bone parings, in order to obtain substances of the consistency of stone having a specific gravity relatively slight, and being endowed with a certain elasticity; sixth, making or molding mosaics, inlaid floors, either plain or of various colors, mantel-pieces or wainscoting, so as to imitate marble; seventh, cementing fractured stones or jewels, repairing statuary, &c., manufacturing gutter-spouts, and as a water-proof substance cementing walls; eighth, the preparation of a cement in the form of a powder which can be used for the same purposes as plaster, having the advantage of furnishing a coating which does not crack or split much harder than the plaster. This last cement is prepared as follows: Chloride of magnesium, (dry,) the chemical equivalent; calcined magnesia, the chemical equivalent; fine sandstone or other powder, about three times the weight of the magnesia. This proportion can be varied. Water in sufficient quantity to mix the ingredients.

Lastly, this invention has for its object the agglomeration, aggregation, hardening, and molding of mineral, vegetable, or animal substances by means of the oxychloride of magnesium, and the preparation with this element, whether alone or combined with other ingredients, of a plastic material which acquires great hardness in a few days.

I claim—

As a new product, the magnesia cement, or cement having a magnesia base, composed substantially as herein described, for purpose of forming various substances used in the arts by agglomeration or molding, as herein set forth.

In testimony whereof I have signed my name to this specification before two subscribing witnesses.

S. SOREL.

Witnesses:
   A. BLETRY,
   EDWARD TUCK.